Figure 1:
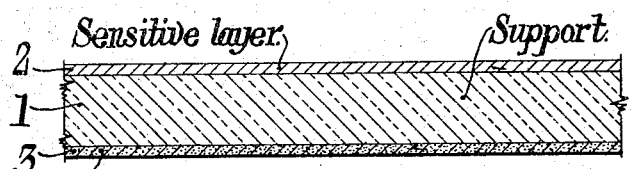

May 7, 1935.  C. R. FORDYCE  2,000,587

PHOTOGRAPHIC FILM

Filed Nov. 18, 1933

Non-halation coating of ethanolamine salt of a dicarboxylic acid ester of cellulose (triethanolamine salt of cellulose acetate phthalate)

Protective coating of ethanolamine salt of a dicarboxylic acid ester of cellulose (May contain filter dye.)

Inventor:
Charles R. Fordyce,
By Newton M. Perkins
Daniel J. Mayne
Attorneys

Patented May 7, 1935

2,000,587

UNITED STATES PATENT OFFICE 2,000,587

PHOTOGRAPHIC FILM

Charles R. Fordyce, Rochester, N. Y., assignor to Eastman Kodak Company, Rochester, N. Y., a corporation of New York Application November 18, 1933, Serial No. 698,664

9 Claims. (Cl. 95—9)

This invention relates to photographic film having an anti-halation backing and particularly an anti-halation backing comprising a water-soluble ethanolamine salt of a cellulose dicarboxylic acid ester. This application is in part a continuation of my application Serial No. 632,793 filed September 12, 1932.

The ethanolamine salts of the cellulose dicarboxylic acid esters are, as described in that application, water-soluble and especially suitable, when a water-soluble dye is admixed therewith, as anti-halation backings for photographic film. The preparation of these salts is described in that application and need not be repeated here except to state that they are prepared by reacting with an ethanolamine, such for instance as triethanolamine, upon a dicarboxylic acid ester of cellulose in which one of the carboxyl groups of the dicarboxylic acid radical is free and unesterified.

It is, therefore, an object of the present invention to provide a photographic film having a coating of a water-soluble ethanolamine salt of a dicarboxylic acid ester of cellulose. Another object is to provide a photographic film having an anti-halation backing of such a salt dyed with a suitable dye. Other objects will hereinafter appear.

Some of the salts prepared in accordance with my above application and which are useful in the present invention are as follows:

Cellulose triethanolamine phthalate.
Cellulose acetate triethanolamine phthalate.
Cellulose triethanolamine succinate.
Cellulose acetate triethanolamine succinate.
Cellulose triethanolamine diglycollate.
Cellulose diethanolamine phthalate.
Cellulose monoethanolamine phthalate.
Cellulose acetate diethanolamine succinate.
Cellulose acetate propionate triethanolamine phthalate.

In the photographic industry the problem of taking photographs of scenes involving "high lights" or light of more than ordinary intensity has often presented itself. For instance bright lights will give, instead of a clear image upon the negative, a sort of fuzzy halo effect. This action of "high lights" on photographic film is known as "halation" and is due to reflection of light from the back side of the film. One of the methods of overcoming this halation is by the use of water-soluble colored backing (preferably black), applied to the back of the film to subdue or eliminate this reflection which backing (including the dye) is dissolved off by the ordinary photographic baths with which the film is treated.

These ethanolamine salts being water-soluble are valuable in solution with a compatible and suitable dye for the application of this colored layer or "anti-halation backing" to the rear surface of a photographic film because these ethanolamine salts are removed or dissolved off by the wash water following development of the negative. Since these salts are difficultly soluble or insoluble in strongly alkaline baths, they will not be removed or so affected by ordinary alkaline developing baths as to affect the developing baths. The removal of the non-halation coating from the developed negative is, of course, very desirable to facilitate the making of photographic prints therefrom. Suitable dyes and a further description of the application of such coatings is described and more generically claimed in the patent of Hickman, No. 1,939,171, granted December 12, 1933 and the patent of Malm No. 1,884,035, granted October 25, 1932. The use for other purposes of colored cellulose derivative coatings which are water-soluble will also be suggested to those interested in other arts.

These ethanolamine salts are particularly suitable as coatings for photographic films because of their property of good adherence to photographic film support; because of their ready water-solubility they are easily applied to photographic film and, as before related, are easily removed from the film by the ordinary photographic processing baths such as in the washing of the film following development.

The following is an illustration of the applicability of these salts as a backing for photographic film:

A 5% solution of a cellulose acetate triethanolamine phthalate in a solvent comprising a mixture of water and methyl alcohol in equal volumes was prepared. A small amount of a water-soluble dye such as dianil blue R (color index No. 390) was then added to the solution and a piece of cellulose acetate film about 3 in. wide was drawn through it. The film was dried at about 100° C. for 5 to 15 minutes and found to have a uniform colored overcoating thereon. The film was then placed in a beaker of distilled water and the colored overcoat was dissolved almost immediately from the colorless cellulose acetate support, showing that following the development of photographic film having a backing or coating of a cellulose acetate triethanolamine phthalate carrying a water-soluble dye, this backing layer or coating will all dissolve away so that it will be absent from the finished negative. The other ethanolamine salts above named behave similarly and may likewise be utilized.

The photographic film may be coated with these ethanolamine salts at any convenient point in their manufacture, such as immediately following the formation of the film support or base itself, after which the support is coated with the light sensitive emulsion in the usual way. The ethanolamine salt is conveniently coated upon the film base from a solution, such as described above, by means of an applicator roll supplied by a trough or hopper with the salt solution; the solution may also be sprayed onto the film. Such coating methods are well known to those skilled in the art.

The ethanolamine salt may be employed in various concentrations depending upon the thickness of coating which is desired, the more concentrated the solution the thicker the coating. A plain water solution of the salt may be employed, although experience has shown that the addition of a little methyl or ethyl alcohol to the solution will facilitate application of the solution to the film. Various water-soluble dyes may be employed, such as are known to those skilled in the art. For instance, one may employ, singly or in combination, the following dyes:

| Dye | The color index (1924) |
| --- | --- |
|  | Number |
| Rhodamine B | 749 |
| Crystal violet 6B | 681 |
| Nigrosine | 865 |
| Bismarck brown | 331 |
| Tartrazine | 640 |
| Benzopurpurine | 448 |
| Congo red | 370 |
| Naphthol green | 5 |
| Metanil yellow | 138 |
| Auramine | 655 |

It is to be understood that a protective covering or an anti-halation backing of an ethanolamine salt of a dicarboxylic acid ester of cellulose may be applied to any film or sheet comprising a cellulose derivative whether of cellulose acetate, cellulose nitrate, a cellulose ester, a mixed organic ester of cellulose such as cellulose acetate propionate, etc. It is of course apparent that if the film or sheet were of a water-soluble derivative there would, however, be technical difficulties arise which would make the application of such a backing difficult although possible with that type of film.

These ethanolamine salts may similarly be employed, if desired, for protective layers and the like for photographic films such as a transparent non-abrasion layer over the emulsion coating and in other relations which will occur to those skilled in the art, such as a carrier for light filtering dyes in an overcoating for the emulsion. These layers being water-soluble are, of course, readily removable by the wash water following development of the film.

For purposes of illustration, there are shown on an enlarged scale in the attached drawing, two figures showing sections of typical photographic elements including my invention.

Figure 2:
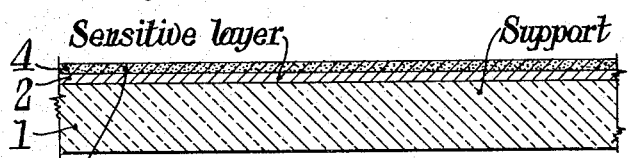

In each figure the support of any suitable or desirable material is designated 1 and the sensitive layer 2. In Fig. 1, the layer 3 of any of the salts mentioned containing any suitable anti-halation dyes or pigments is applied to the rear surface and in Fig. 2 it is shown as a protective layer 4, which may contain a filter dye, over the sensitive layer.

Various other modifications of my invention, apparent to those skilled in the art upon inspection of the above disclosure, are also to be understood as included within the scope of my invention as defined by the appended claims.

What I claim is:

1. A photographic film comprising a cellulose derivative base, a light sensitive emulsion thereon and, upon at least one side of said film, a coating comprising a water-soluble ethanolamine salt of a dicarboxylic acid ester of cellulose.

2. A photographic film comprising a cellulose derivative base, a light sensitive emulsion thereon and, upon at least one side of said film, a coating comprising the triethanolamine salt of a dicarboxylic acid ester of cellulose.

3. A photographic film comprising a cellulose derivative base, a light sensitive emulsion thereon and, upon at least one side of said film, a coating comprising the triethanolamine salt of cellulose acetate phthalate.

4. A photographic film comprising a cellulose derivative base, a light sensitive emulsion upon one side thereof and, upon the other side thereof, a coating comprising a water-soluble ethanolamine salt of a dicarboxylic acid ester of cellulose.

5. A photographic film comprising a cellulose derivative base, a light sensitive emulsion upon one side thereof and, upon the other side thereof, a coating comprising the triethanolamine salt of a dicarboxylic acid ester of cellulose.

6. A photographic film comprising a cellulose derivative base, a light sensitive emulsion upon one side thereof and, upon the other side thereof, a coating comprising the triethanolamine salt of cellulose acetate phthalate.

7. A photographic film comprising a cellulose derivative base, a light sensitive emulsion upon one side thereof and, upon the other side thereof, a coating comprising a water-soluble ethanolamine salt of a dicarboxylic acid ester of cellulose and a water-soluble dye.

8. A photographic film comprising a cellulose derivative base, a light sensitive emulsion upon one side thereof and, upon the other side thereof, a coating comprising the triethanolamine salt of a dicarboxylic acid ester of cellulose and a water-soluble dye.

9. A photographic film comprising a cellulose derivative base, a light sensitive emulsion upon one side thereof and, upon the other side thereof, a coating comprising the triethanolamine salt of cellulose acetate phthalate.

CHARLES R. FORDYCE.